United States Patent [19]
Delprat et al.

[11] Patent Number: 5,398,247
[45] Date of Patent: Mar. 14, 1995

[54] TDMA RADIO-COMMUNICATION METHOD

[75] Inventors: Marc Delprat, Le Chesnay; Jean-Louis Dornstetter, Plaisir; Philippe Mege, Bourg-La-Reine, all of France

[73] Assignee: Matra Communication, France

[21] Appl. No.: 39,729

[22] Filed: Mar. 30, 1993

[30] Foreign Application Priority Data

Mar. 31, 1992 [FR] France .................. 92 03883

[51] Int. Cl.$^6$ .................. H04B 7/212; H04J 3/16
[52] U.S. Cl. .................. 370/95.1; 370/95.3; 370/112
[58] Field of Search .................. 370/24, 29, 77, 79, 370/82, 84, 85.7, 94.1, 94.2, 95.1, 95.3, 100.1, 105, 105.1, 105.2, 110.1; 455/33.1, 34.1, 34.2, 53.1, 54.1

[56] References Cited

U.S. PATENT DOCUMENTS

| | | | |
|---|---|---|---|
| 4,754,453 | 6/1988 | Eizenhöfer | 370/95.1 |
| 4,763,322 | 8/1988 | Eizenhöfer | 370/95.1 |
| 5,001,703 | 3/1991 | Johnson et al. | 370/79 |
| 5,193,091 | 3/1993 | Crisler et al. | 370/95.1 |
| 5,199,031 | 3/1993 | Dahlin | 370/95.3 |

FOREIGN PATENT DOCUMENTS 2262933  6/1974  Germany.
0834247  5/1960  United Kingdom.

OTHER PUBLICATIONS

International Switching Symposium 1987 Phoenix, US; 15–20 Mar. 1987 pp. 759–765 P. Robert et al.: Alcatel Land Mobile System CD900 A Fully Digital Cellular Approach Using Wideband TDMA.

39th IEEE Vehicular Technology Conference 1–3, May, 1989; San Francisco, US; vol. 2, pp. 712–717; A. Maloberti: Radio Transmission Interface Of The Digital Paneuropean Mobile System.

*Primary Examiner*—Alpus Hsu
*Attorney, Agent, or Firm*—Larson and Taylor

[57] ABSTRACT

According to the method, a physical transmission channel is split into a plurality of logic channels which may be dedicated to different communications. Each logic channel consists of time slots having a same duration and the same rank in successive frames of constant length. At least one of the logic channels is split into a plurality of sub-channels dedicated to different communications. Groups of k successive time slots (k being an integer greater than 1) are allocated to each logic sub-channel. The groups are time distributed in a regular way and k is so selected that N be different from (m.k+1) where m is an integer and N is the number of time intervals necessary for reconstructing an information block.

6 Claims, 8 Drawing Sheets

TDMA RADIO-COMMUNICATION METHOD

BACKGROUND OF THE INVENTION

The invention relates to time division multiple access digital radio-communication systems known as TDMA, wherein a physical transmission channel is time-divided into a plurality of logic channels which may be assigned to different communications, each logic channel consisting of time slots having a same serial number in successive frames of constant length.

There may be data or voice communications which do not require the maximum rate or "full rate" authorized by a logic channel. It has already been proposed to divide a logic channel into a plurality of sub-channels, (two sub-channels for example).

In frequent cases, reconstruction of a part of message cannot be carried out before all bits representing that part have been received. This situation exists when the communication is coded with an error detection or correction code or crypted.

Half-rate transmission is conventionally achieved by assigning a time slot having a predetermined number to one of the sub-channels in the odd frames and the same time slot to the other sub-channel in the even frames. The transmission delay which results from the time duration required for receiving a given number of bits is then doubled. It is still increased when a logic channel is divided in more than two sub-channels.

For instance, with a multiplex of order p=4 with n=2 sub-channels per logic channel, the sequence of dedications is as follows, with i/j designating the jth sub-channel of the ith channel:

It can be seen that the time distribution of the allocated time slots remains regular, but the time period necessary for completely transmitting a data block which was available just before appearance of a dedicated time slot (for instance 0/0) increases and may be doubled in certain cases.

More generally, with:
N: number of time slots necessary for recovering the whole information or data constituting a block,
$T_T$: duration of a time slot,
p: the order of the multiplex,
n: number of sub-channels per channel,
$R_T$: transmission delay,
then:

$$R_T = [(N-1).n.p + 1]T_T \quad (1)$$

Oftentimes, the time delay should not exceed a maximum value for being acceptable. For voice transmission it should not exceed about 500 ms.

Formula (1) can be generalized to the transmission of voice data with interleaving of a plurality of blocks for protection. Then N represents the number of time slots required for interleaving.

In the following frequent references will be made to implementation of the invention in a GSM communication system, with time division and slow frequency hopping, where transmission is carried out in successive frames of eight time slots each of 577 μs, each time slot comprising 156,25 bit periods and having a useful length of 147 bits. GSM (for "Groupe Special Mobiles" or "Global System for Mobile communication") is a cellular pan-european public mobile communication system in the 900 MHz band. The invention is however also applicable to time division multiplex systems of orders (for example 4) and, although it has then less interest, to systems without frequency hopping.

In a GSM system in accordance with recommendation GSM 05-02 of June 1991, to which reference may be made, the digitally encoded voice channel are designed for authorizing either "full rate" or "half rate". Data transmission may also be provided for "full rate" and "half rate", the full rate and half rate channels respectively corresponding to gross rates of 22,8 and 11,4Kbits/s. According to the recommendation, transmission in "half rate" is in accordance with the above-identified approach, which was felt preferable because it provides a complety homogenous time division between the radio-electric resources.

A number of documents exist which indicate how to insert a variable flow of data on a transmission medium, but do not deal with the problem of communication delay. Reference may for instance be made to 39th IEEE Vehicular Technology Conference, May 1-3, 1989; San Francisco, U.S.A.; Vol. 2, pages 712-717; A. Maloberti: Radio Transmission Interface of the Digital Paneuropean Mobile System.

SUMMARY OF THE INVENTION

It is an object of the invention to decrease the transmission delay suffered by communications transmitted on logic sub-channels having a reduced rate without increasing the transmission delay for the other sub-channels. It is an ancillary object of the invention—when communications are faced with fading problems—to achieve a compromise which is close to optimum between the desirable decrease in the transmission delay and the desirable reduction of the detrimental effect of perturbations which are time or space localised.

For this purpose, there is provided a digital transmission method of the above-defined type wherein at least one of the logic channels is divided into a plurality of sub-channels dedicated to different communications, characterized by assigning specific groups each of k successive time slots (k being an integer greater than 1) to each logic sub-channel, said groups being regularly time distributed and k being so selected that N be different from (m.k+1) where m is an integer and N is the number of time slots necessary for reconstructing an information block.

Then the transmission delay for a sub-channel may be written as:

$$R_T = [E((N-1)/k).k.n.p + MOD(N-1,k) + 1]T_T \quad (2)$$

where:
E(X) designates the integer part of X,
MOD(N−1,k) designates the residual part of N−1 mod k.

Formula (2) indicates that the gain G on the delay $R_T$ is maximum when MOD(N−1,k) is maximum, i.e. when:

N=λ.k, λ being an integer.

Then the maximum gain $G_M$, as compared with the condition illustrated by formula (1) is:

$$G_M = (K-1)(n.p-1).T_T \quad (3)$$

More generally, a non zero gain G is obtained each time k is greater than 1. For $N=k\lambda-i$ (with $\lambda$ being an integer and i being an integer fulfilling the condition $k-1 > i > 0$):

$$G = (k-i-1)(np-1).T_T \quad (4)$$

The condition for obtaining a non zero gain may also be written as $i \neq k-1$, or $N \neq mk+1$ (m being a positive integer).

The selection of k will typically result from a compromise which will depend from the characteristics of the physical transmission channel.

First of all, k should be sufficiently low for not unduly delaying the sub-channels other than the sub-channel which is favored.

When transmission occurs on perturbated channels (toward mobile stations or from mobile stations for instance), it is preferable not to locate the interleaved pieces of information or data belonging to a same block too mutually close; that constraint disappears when transmission occurs with frequency hopping, as for GSM, since the propagation conditions between two successive time slots are then uncorrelated.

Additional constraints may exist, in relation with the transmission system.

For instance the GSM does not make it possible to modify the distribution of the time slots allocated to each physical channel, due to the time necessary for transmissio-reception switching in the mobile stations, such switching involving frequency changes required by slow frequency hopping transmission.

It is however possible, without modifying the allocation of the time slots to logic channels, to modify the allocation of the time slots for each logic sub-channel and to decrease the time duration required for full transmission of a block.

For simplification, the case of a multiplex of order 4 with two logic sub-channels per channel, already mentioned, may be considered. Then the above constraint authorizes the following grouping with k=2:

| 0/0 | | | 0/0 | | | 0/1 | | | 0/1 | | | 0/0 |

Again, i/j designates the jth sub-channel of channel i.

If the above constraint had not existed, then the distribution could have been:

| 0/0 | 0/0 | ----- | 0/1 | 0/01 | ----- | 0/0 |

When the digital communication method is of the above-defined type but does not include all constraints of the GSM system, alternative methods are possible. In a method applicable when the whole information carried on the different sub-channels emanate from a same source, all sub-channels of a same channel are processed as a same information flow, corresponding to only one logic channel. Then transmission on the radio channel is carried out without dedicating the time slots to a specific sub-channel. A time slot then carries information belonging to a plurality of sub-channels.

A more complete understanding of the invention will be obtained from the following description of particular embodiments, given only as examples. The description refers to the accompanying drawings.

DETAILED DESCRIPTION OF EMBODIMENTS

Figure 1:
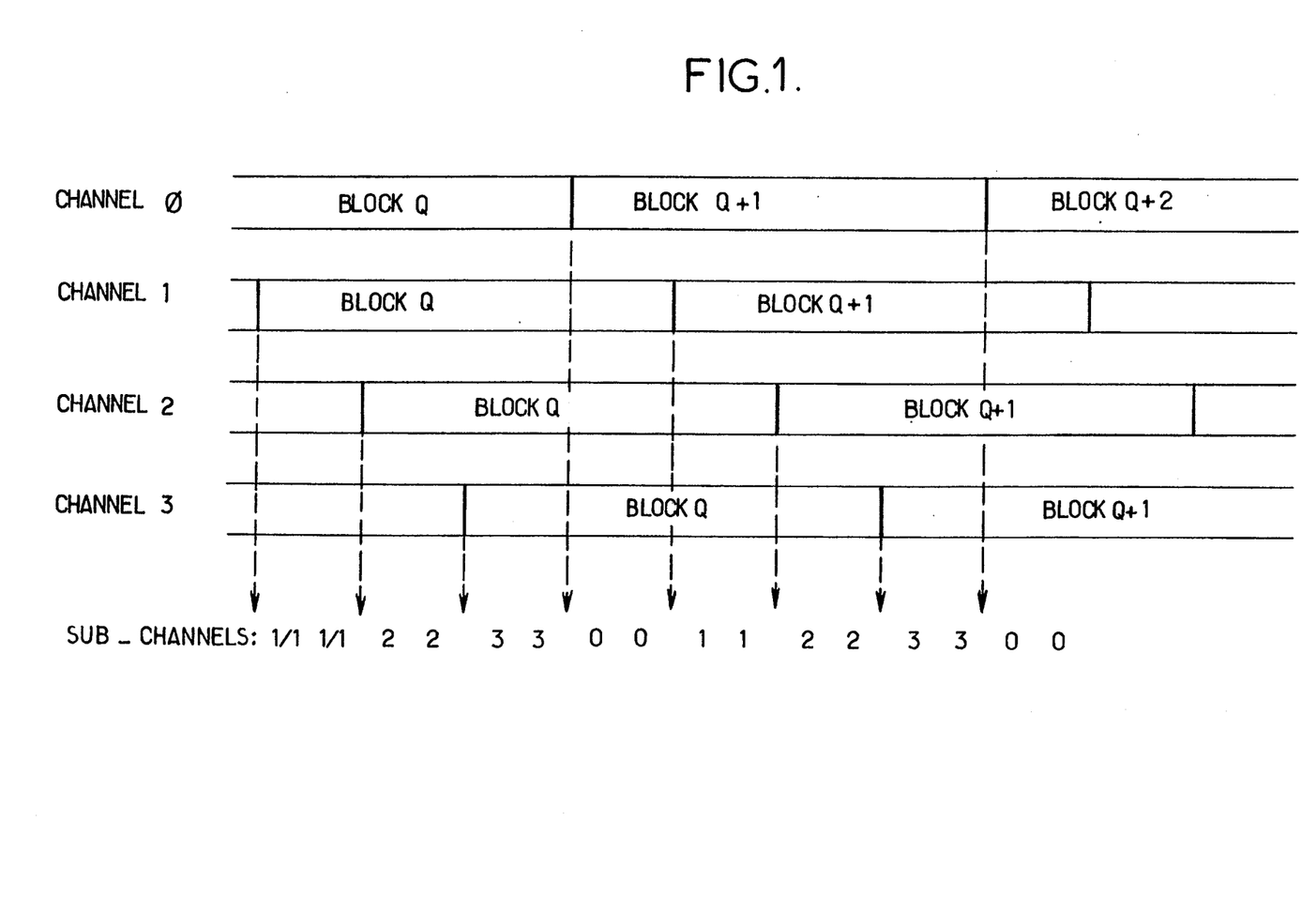
FIG. 1 is a schematic representation of a possible implementation of the invention with a multiplex of order 4, with k=2.

Referring to FIG. 1, there is shown a scheme for implementing the invention with a time multiplex signal of order 4, with four channels, with k=2 and one sub-channel per logic channel. Blocks numbered Q, Q+1, Q+2, ... are mutually offset by a time corresponding to one quarter of a time slot in the different channels. The last line of the figure indicates the distribution of the sub-channels. In the particular case which is illustrated, k=2 successive directly adjacent time slots are attributed to the same sub-channel, thereby decreasing the time period necessary for reconstructing one block.

The time transmission delay is then as given by formula (2) and the gain on time is as given by formula (4). The gain is higher than zero as long as i differs from $k-1$, or that N differs from $mk+1$, m being an integer.

As already indicated, a specific reference will be made to transmission methods including the constraints of GSM. For simplicity, a simplified notation will be used which omits indication of the time slots dedicated to the logic channels other than that which is considered. If for instance reference is made to channel 0, the successive time slots will be written as:

| 0/0 | 0/0 | 0/1 | 0/1 | 0/0 | 0/0 | 0/1 | 0/1 | 0/0 | rather than:

| 0/0 | (1) | (2) | (3) | 0/0 | (1) (2) | (3) | 0/1 | (1) | (2) | (3) | 0/1 |

The transmission delay $R_T$ is then given by the following formula (2bis) where N represents the number of time slots required for interleaving:

$$R_T = [E((N-1)/k).k.n.p + MOD(N-1,k).p + 1]T_T \quad (2bis)$$

$$G = (k-i-1).(n-1).p.T_T \quad (4bis)$$

The time gain G, as given by formula (4bis), is:

maximum and equal to $G_H=(k-1)(n-1)p\,T_T$, for $i=0$, zero for $i=k-1$, which should consequently be avoided.

With GSM as defined by the above-mentioned recommendation GSM 05-02, an additional logic channel called SACCH (Slow Associated Control Channel) is inserted within the sequence of slots.

Figure 2:
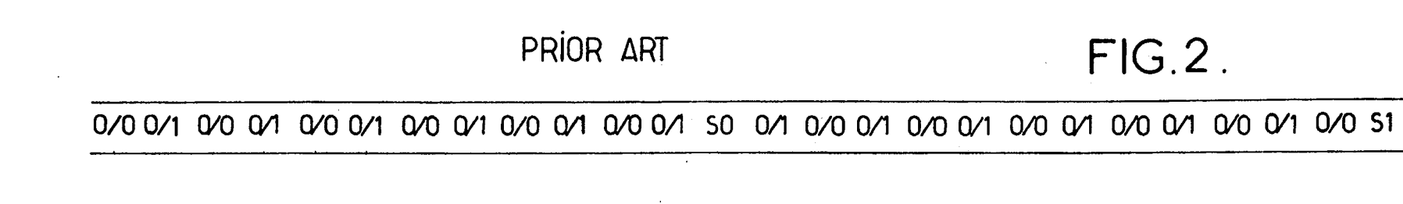
FIG. 2 is a simplified drawing illustrating a conventional frame structure for a GSM system with sub-channels, including a logic control channel.

The frame structure is then as given in FIG. 2, where the time slots allocated to other traffic channels are omitted. On FIG. 2, S0 and S1 respectively designate the logic channels SACCH of physical channels 0 and 1.

The delay $R_T$ is then:

$$R_T=(N.n.p+1)T_T \qquad \text{(1bis)}$$

In formula (1bis), the term $N.n.p+1$ is due to the presence of the additional logic channel.

The presence of channel SACCH does not prevent grouping, in groups of k time slots, the time slots allocated to a same sub-channel.

However, the condition for determining an optimum value for k is slightly modified.

If L is the number of data elements to be transmitted and M is the number of data elements carried as a burst during one time slot, then preferably $k=L/M$. That value of k should be an integer. If the data to be transmitted are delivered steadily, then that value of k provides conditions of transmission which are optimum and which are equitable for all flows of communication, i.e. do not detrimentally affect some of them as regards the transmission delay.

Figure 3:
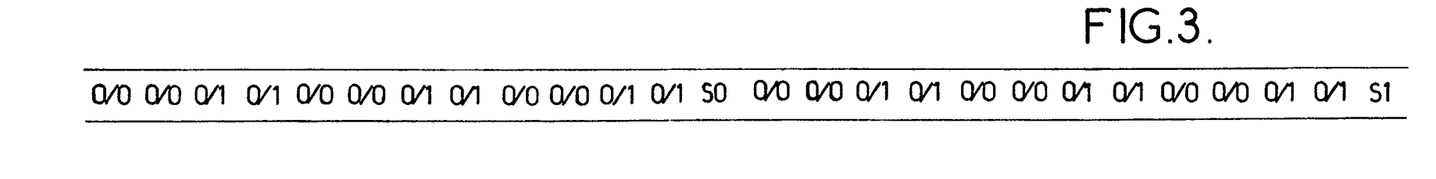
FIGS. 3 and 4 are illustrations of schemes according to the invention suitable for use with GSM having multiframes of twenty-six frames (respectively for voice frames of 20 ms and 30 ms)
Figure 4:
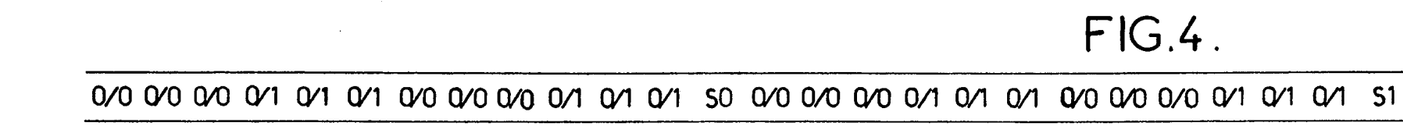

That approach results to the structures illustrated in FIGS. 3 and 4 for voice frames, respectively for $k=2$ and a trame duration of 20 ms and for $k=3$ and a duration of 30 ms.

With that type of structure, the time delay $R_T$ becomes:

$$R_T=[E(N-1)/k).k.n.p+p+MOD(N-1,k).p+1]T_T \qquad \text{(2ter)}$$

The time gain as compared with the regular structure illustrated in FIG. 2 is then:

$$G=[(k-i-1)(n-1)p+p]T_T \qquad \text{(4ter)}$$

Then k is selected for obtaining:

$$k-1 \geq i \geq 0$$

for $N=1k-i$.

Then the gain is:

maximum and equal to $[(k-1)(n-1).p+p].T_T$ for $i=0$;

minimum and equal to $p.T_T$ for $i=k-1$.

As a typical example, with half-rate GSM (i.e. with $k=2$), for frames of 20 ms and interleaving of depth 4 or 6, with $T_T=0.577$ ms and $p=8$, the gain is:

$$G=9.2 \text{ ms.}$$

For half-rate GSM and voice frames of 30 ms, $k=3$ and interleaving of depth 3, the gain is $G=13.8$ ms.

Again for half-rate GSM and frames of 30 ms, but with interleaving of depth 5, the gain is $G=9.2$ ms.

The above-described method is applicable to the up-link (mobile toward base station) as well as to the down link of a system using TDMA frames. If however one of the constraints of GSM is disregarded, the down link offers a supplemental possibility which does not exist for the up-link, since all pieces of information from the down-link originate from the stationary station, consequently from only one source which may easily synchronize all frames in all radiofrequency channels.

Then all sub-channels of a same channel may be considered as equivalent to an undifferentiated set of data which may be interleaved on all time slots available for that channel.

In other words, it is possible to process all sub-channels as a same channel and to interleave all data originating from different sub-channels. All data are then transmitted as a same flow and the time slots need not be dedicated to a specific sub-channel.

Figure 5:
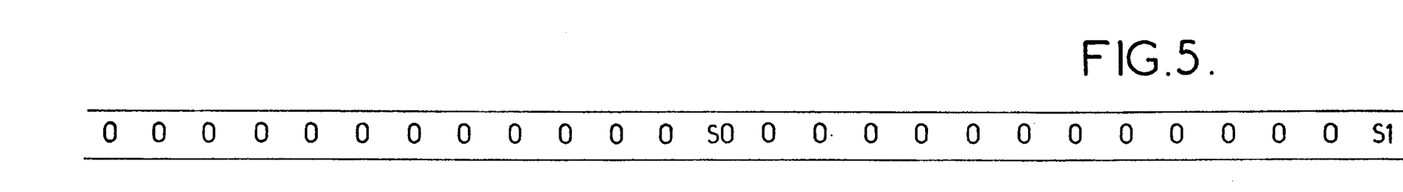
FIG. 5 is a scheme illustrating a possible scheme when omitting one of the GSM constraint, but with control channels.

The structure of FIG. 4 then is changed to that of FIG. 5 and corresponds to the full rate (with the exception of channels S0 and S1).

Then the time delay may be written as:

$$R_T=(N.p+1)T_T \qquad \text{(2quater)}$$

and there is a gain $G_1$ as compared with the scheme of FIG. 2:

$$G_1=N(n-1)p.T_T$$

That gain $G_1$ is $N\times 4.6$ ms for GSM with $n=2$ and $p=8$.

As compared with the schemes of FIGS. 3 and 4, there is a gain $G_2$:

$$G_2=[N-k+i+1)(n-1)p-p]T_T$$

where $N=\lambda k-i$ and $k-1 \geq i \geq 0$.

For interleaving of depth 4 and frames of 20 ms:

$G_1=18.4$ ms $G_2=9.2$ ms

For interleaving of depth 6 and frames of 20 ms:

$G_1=28.6$ ms $G_2=18.4$ ms

For interleaving of depth 3 and frames of 30 ms:

$G_1=13.8$ ms $G_2=0$ ms

For interleaving of depth 5 and frames of 30 ms:

$G_1=23$ ms $G_2=13.8$ ms.

In the present day condition of the recommendations applicable to GSM, that possibility is however not available since the discontinuous transmission method would only be active when there are no data to be transmitted simultaneously on both sub-channels, thereby removing the advantage.

Other constraints present in the GSM system, or more generally in systems using a discontinuous transmission (for instance voice transmission), such as the fact that the beginning of each TDMA frame in the up link is delayed in the base station, e.g. by three time slots, with respect to the beginning of the frame in the down link, while the delay is variable in the mobile stations, are however without any incidence.

It would not be necessary to give a full description of particular means for implementing a system carrying out the method according to the invention. The method only requires a dedication of the data blocks to be transmitted on different sub-channels which is different from those conventionally used and that dedication may be carried out with software while the hardware may be one of those already known. However, some indications will now be given with reference to FIGS. 6–18.

Figure 6:
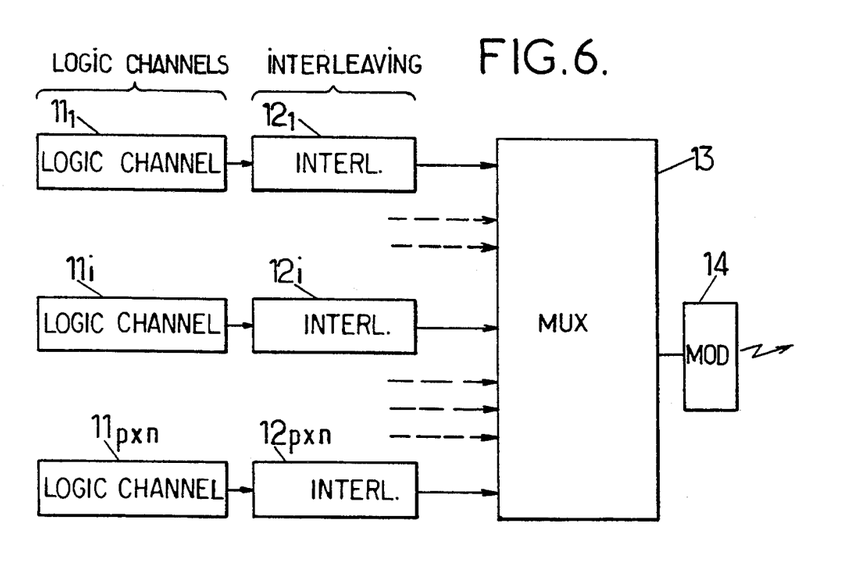
FIGS. 6 and 7 are simplified block diagrams indicating the basic components of the transmission and reception parts of a TDMA base station.
Figure 7:
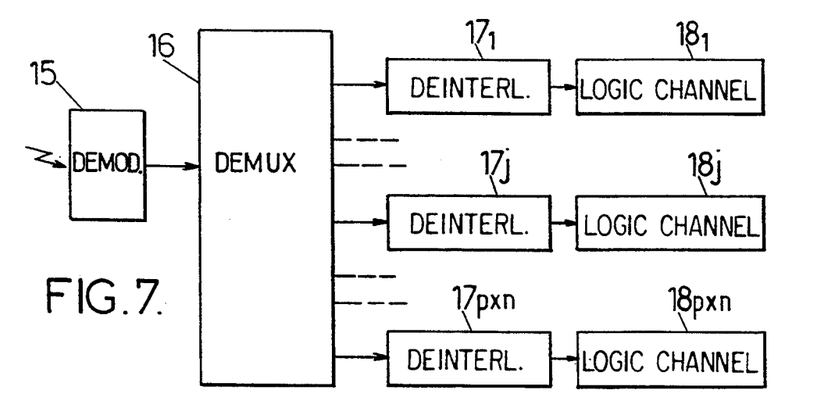

First of all, and for illustration purpose, a global representation of the components is given in FIG. 6 as regards the transmission side and in FIG. 7 as regards the reception side of a base station. The corresponding structures are respectively illustrated in FIGS. 8 and 9 for transmission and reception when only one logical channel (or sub-channel) is present. Such a case exists in the mobile station of a TDMA radio system.

In FIGS. 6 and 7, the indicia attached to the reference numbers do not indicate the order in which the various channels will be communicated to the output. Different rank orders are used conventionally and according to the invention.

Figure 10:
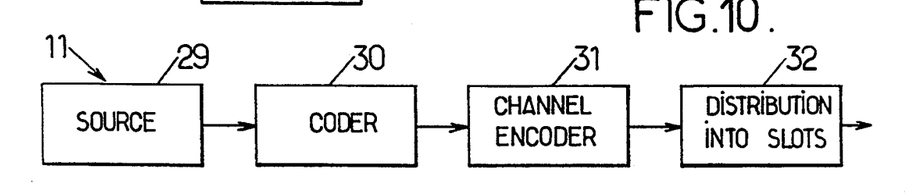
FIGS. 10 and 11 are block diagrams indicating a possible construction of modules found in FIGS. 6-9.

Referring to FIGS. 6 and 7, each module $11_i$ is for forming a logical channel (or sub-channel) and may be as described in FIG. 10. The output of module $11_i$ (with i being equal to 1, ..., pxn) consists of successive bursts each in a time slot. One original information block is carried by a fixed number of successive time slots. Module $12_i$ fulfils the interleaving function. It receives bursts each having the length of a time slot at the input thereof, interleaves the information of each burst on a plurality of time slots, and outputs interleaved time slots with the same format as at the input.

This function may in some applications be completely transparent.

At the output of module $12_i$ the original information block is spread over N successive time slots. The module 3 is a multiplexer and the invention applies more specifically to this module.

The inputs of module 13 are connected to the outputs of the different modules $12_i$. Each input is formated in the same way, with successive time slots. The module 13 multiplexes the inputs by reading one time slot from each successive input in sequence. After $T_T$ it connects the next input and delivers it on a single output which drives the physical channel. The module 13 then connects the next input after $T_T$. Consequently module 13 builds the TDMA structure. The output of module 3 feeds the modulator 14 of a transmitter for broadcast to a distant station. When module 13 has processed its (pxn)th input (last input), it reverts to the first input.

Figure 8:
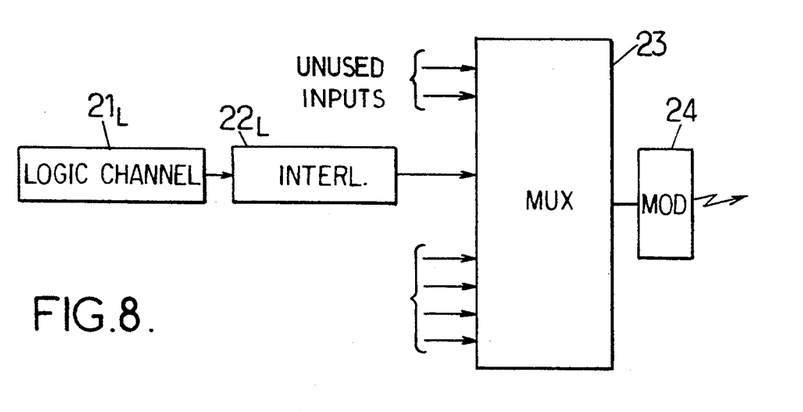
FIGS. 8 and 9, similar to FIGS. 6 and 7, are simplified block diagrams indicating a possible construction of the transmission and reception parts of a mobile station in a TDMA system.

In the arrangement illustrated in FIG. 8, a single channel (or sub-channel) is present. This is the case of a mobile station where a logic channel (or sub-channel) must be transmitted in TDMA. Then multiplexer 23 scans its different inputs in succession. Most inputs are not active and correspond to logic channels (or sub-channels) that are not actually used at the mobile station but correspond to communications carried on the physical channel and inserted by other mobile stations present in the system.

When there is no data present at an input, multiplexer 23 does not deliver an output on the physical channel and nothing is transmitted to the distant station during the time slot duration ($T_T$). When on the other hand information is present at the respective input (Lth input in FIG. 8), one burst in one time slot originating from modules $21_L$ and $22_L$ is transferred from the input to the output of multiplexer 23, and then to modulator 24.

FIG. 7 gives a global scheme of the receiving side. The functions are symmetric of the functions present at the transmitting side. Module 15 achieves the demodulation function (symmetric of the modulation function of module 14) and delivers the demodulated data formated in time slots or bursts.

Module 16 is a demultiplexer (symmetric of module 13). At frequency $1/T_T$, module 16 transfers the burst of an input time slot to one output, and then directs the next to the following output. After the last output (output pxn), it again directs toward the first output. The outputs are formated in time slots. Modules $17_i$ perform the de-interleaving function (symmetric to that of module $12_i$). It receives and delivers bursts in time slots. The modules $18_i$ (as for instance described in detail in FIG. 11) give the desired information from the bursts occupying time slots outputed by the modules $17_i$.

Figure 9:
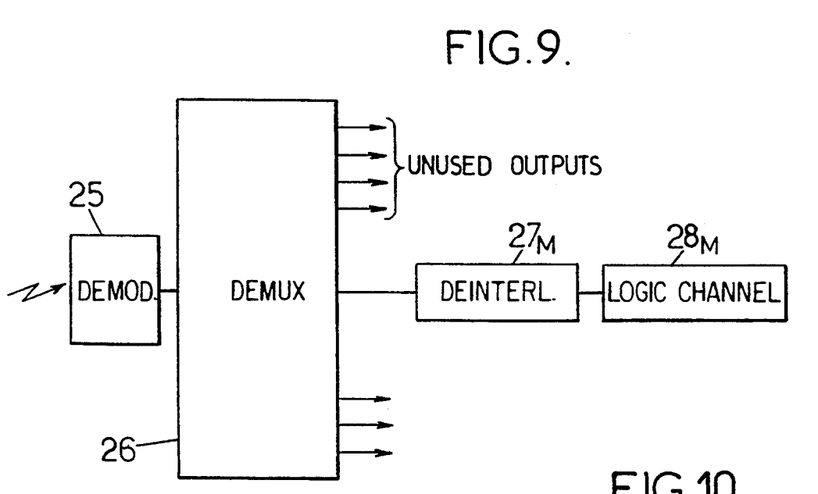

FIG. 9 is quite similar to FIG. 7 but corresponds to only one active logical channel (or sub-channel). The system operates similarly. A difference is that module 26 delivers an output only when it is switched on the only active output (M). It delivers no output in the other cases.

The scheme of FIGS. 7 and 9 can be extended to more than one active channel (or sub-channel).

Referring to FIG. 10, module 11 may contain a source module 29 (for example speech source or data source). The digital output of module 29 is formated in frames and is input to a module 30 that carries out either a source encoding function (e.g. for speech or image), or formating of incoming information (e.g. for data transmission) or both functions. The output of module 30 is applied to module 31 that carries out channel encoding for protection against errors that may appear on the transmission medium (e.g. radio transmission). The output of module 31 consists of coded frames. Module 32 receives the coded frames or "blocks" and distributes each block in N time slots. The coded frame has a constant number of elements time slots. The output of module 32 is consequently formated in time slots.

The construction of FIG. 10 may apply either to one logical channel, (if there is no sub-subchannel), or to one logical sub-channel.

Figure 11:
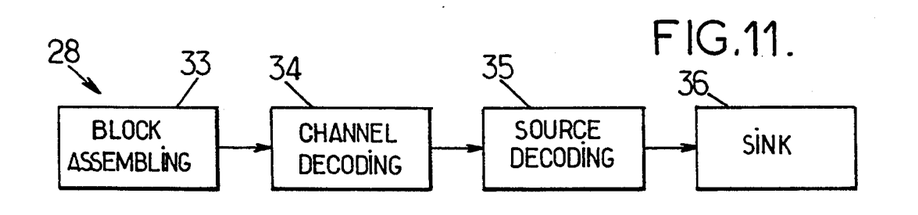

Referring to FIG. 11 a typical module 28 may include a first module 33 which receives the time slots and, after reception of N time slots, assembles them and delivers a block to module 34 after de-formating. The module 34 performs the channel decoding function and delivers a coded frame to module 35 for source decoding (e.g. for speech decoding or image decoding) and/or de-formating (e.g. for data transmission). Module 36 constitutes a sink and receives estimated information for output.

Again FIG. 11 is applicable either to a logical channel—if there is no sub-channel—or to a logical sub-channel. The rank ordering of the inputs of module 13 is now presented in different configurations implementing the presentation of the invention.

Various implementations of the invention will now be given with reference to FIGS. 12–17, wherein it will be assumed that the multiplexing module 13 selects its inputs from the top to the bottom in sequence (the same being true for module 16).

In a conventional TDMA system, the channels would be selected in that order. For clarity, any index x, y, z will designate module x for logic channel y and sub-channel z.

Figure 12:
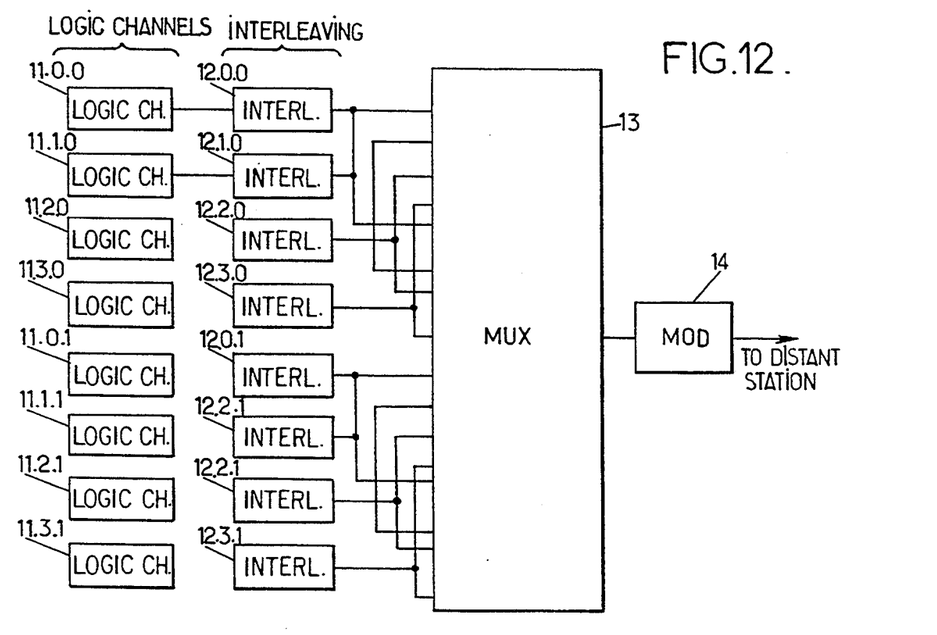
FIGS. 12-18 are block diagrams indicating various possible implementations of the invention in a base station.

Referring to FIG. 12, an implementation of a TDMA scheme will be given which takes into account constraints on logical channel ordering but no constraint on sub-channel ordering in which the transmission delay is reduced by applying the invention.

Figure 13:
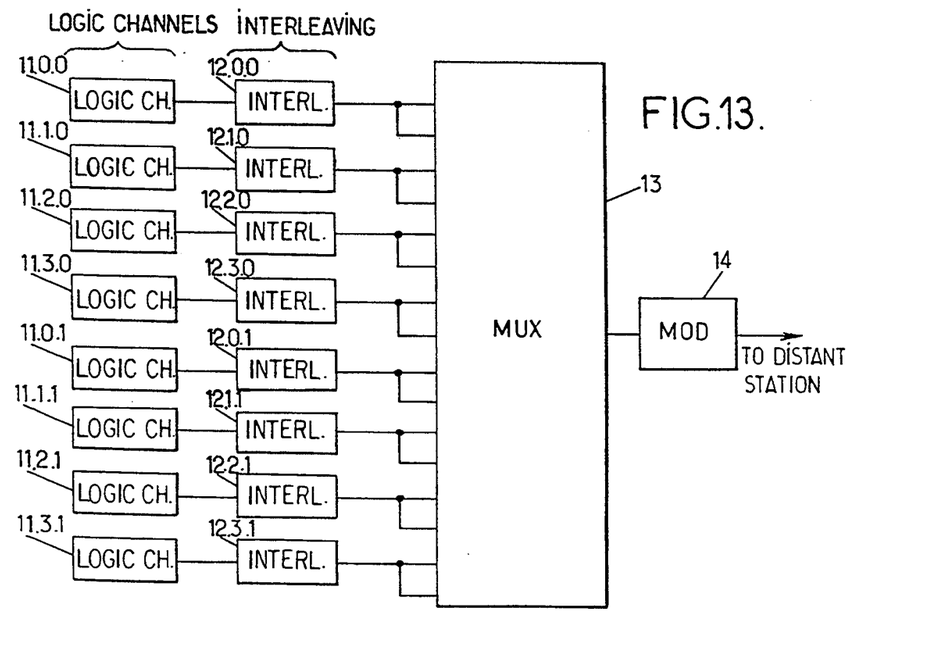

FIG. 13 illustrates a possible implementation of a TDMA scheme with no constraint on logic channel ordering and no constraint on sub-channel ordering, again with reduction of the transmission delay according to the invention.

Figure 14:
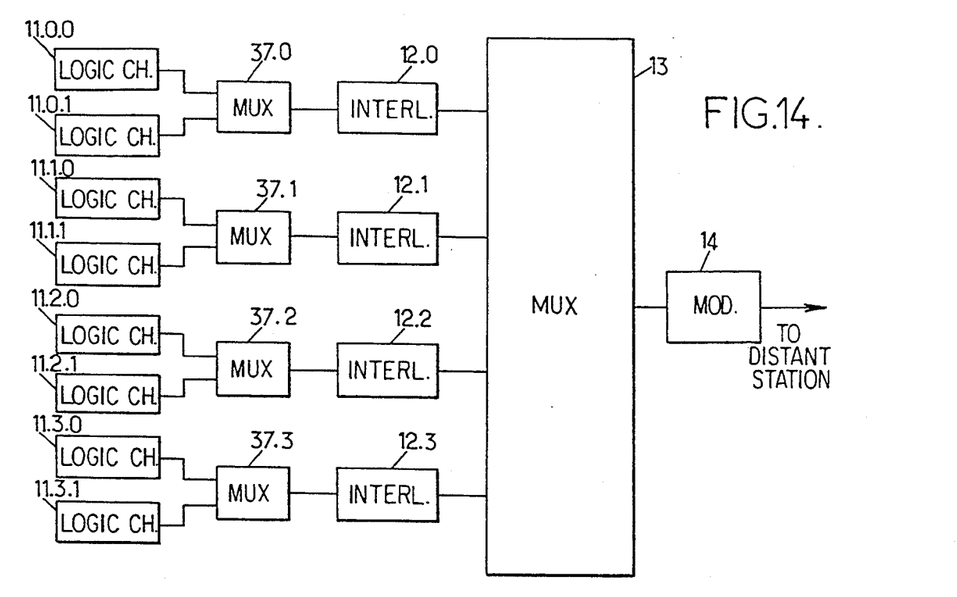

FIG. 14 illustrates a possible implementation of a TDMA system according to the invention without all constraints of the GSM system. Data from different sub-channels of the same logical channel are mutually interleaved together. The implementation is given for four logical channels and two sub-channels per logical channel.

The embodiment of FIG. 14 includes a supplemental module 37. Module 37 is a multiplexer similar to module 13 but with only two inputs connected to two modules 11 for forming in time slots. For instance module $37_i$ (i being the rank of logic channel) delivers multiplexed time slots to module $12_i$.

Figure 15:
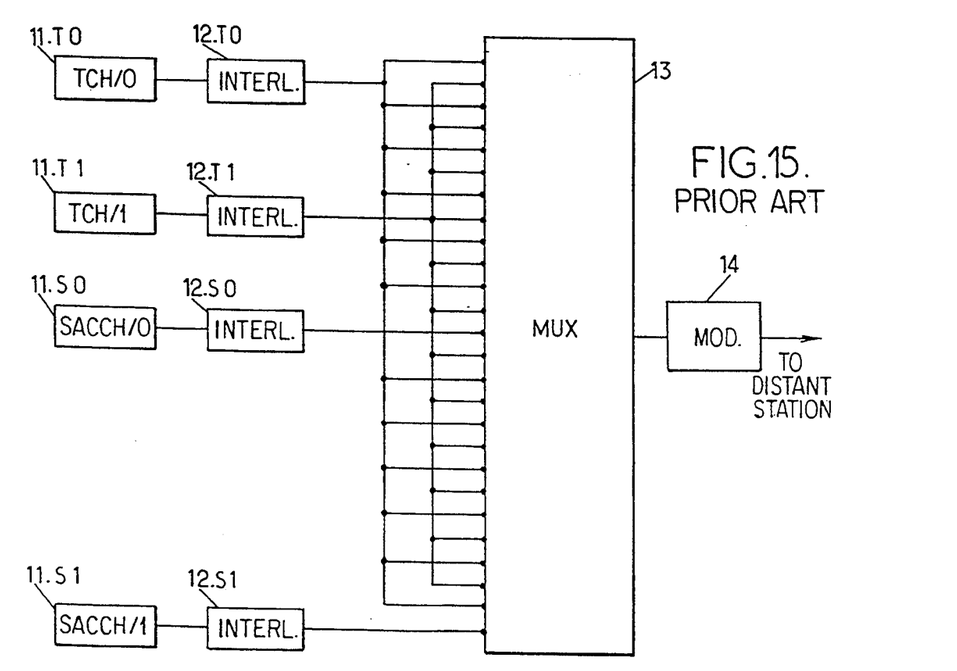

Referring to FIG. 15, a possible implementation of the 26 superframe structure of the GSM system in conformity with recommendation GSM 05-02 of June 1991 is given. However only one logic traffic channel is represented with two sub-channels on FIG. 15.

There are two traffic sub-channels TCH/0 and TCH/1 and the corresponding "slow" associated control channels SACCH/0 and SACCH/1.

A reference $x_{Tz}$ designates module x for sub-channel TCH/z (Nz equals 0 or 1), and $x_{SNz}$ means module x for sub-channel SACCH/z (z equals 0 or 1). FIG. 15 is to be compared with FIG. 2.

Figure 16:
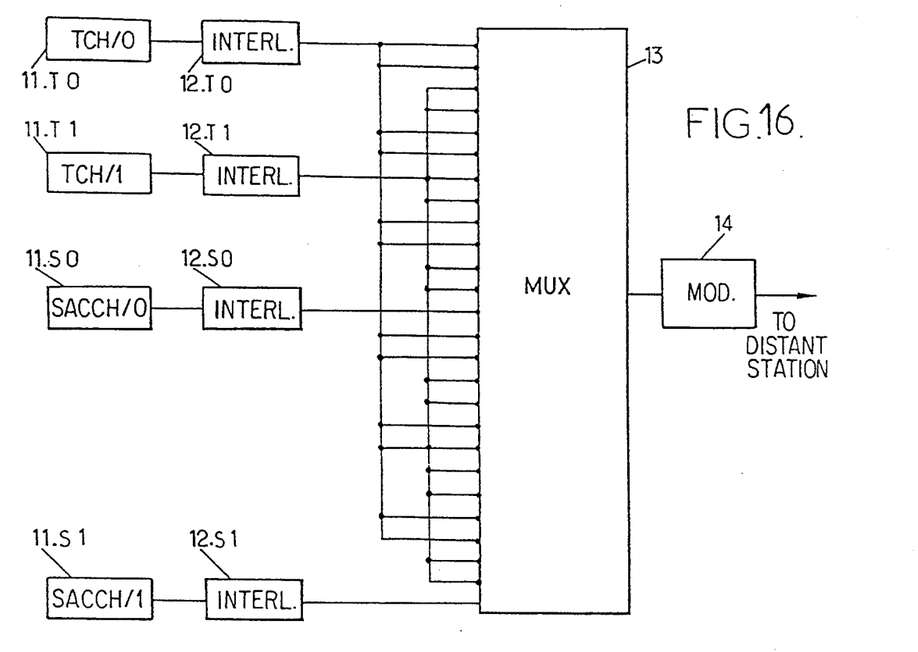

FIG. 16 gives an optimized implementation of a 26 superframe GSM structure according to the invention for speech frames of 20 ms, to be compared with FIG. 3.

Figure 17:
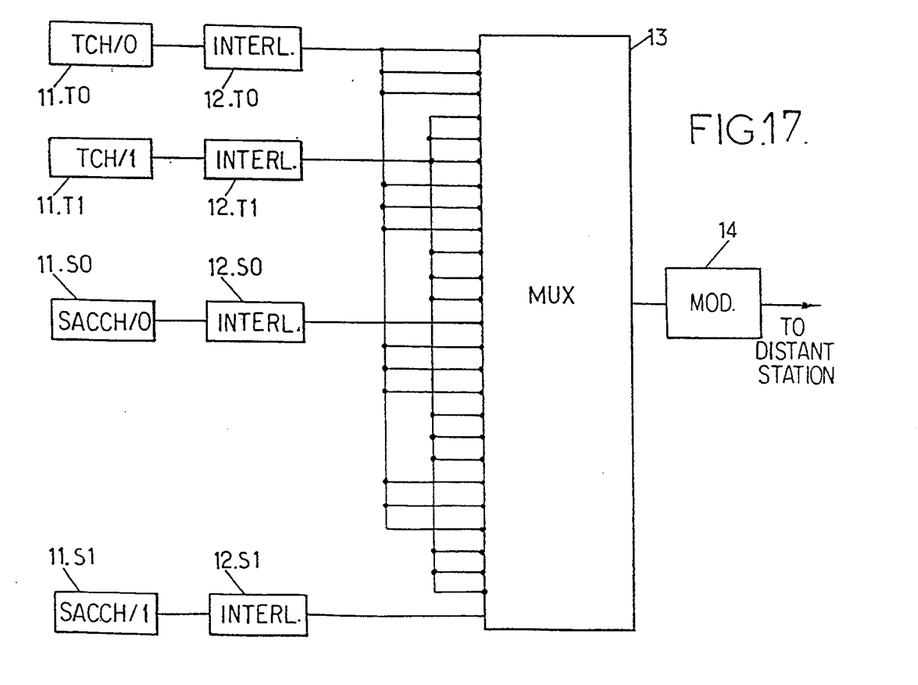

FIG. 17 gives an optimized implementation of a 26 superframe GSM structure according to the invention for speech frames of 30 ms, to be compared with FIG. 4.

Figure 18:
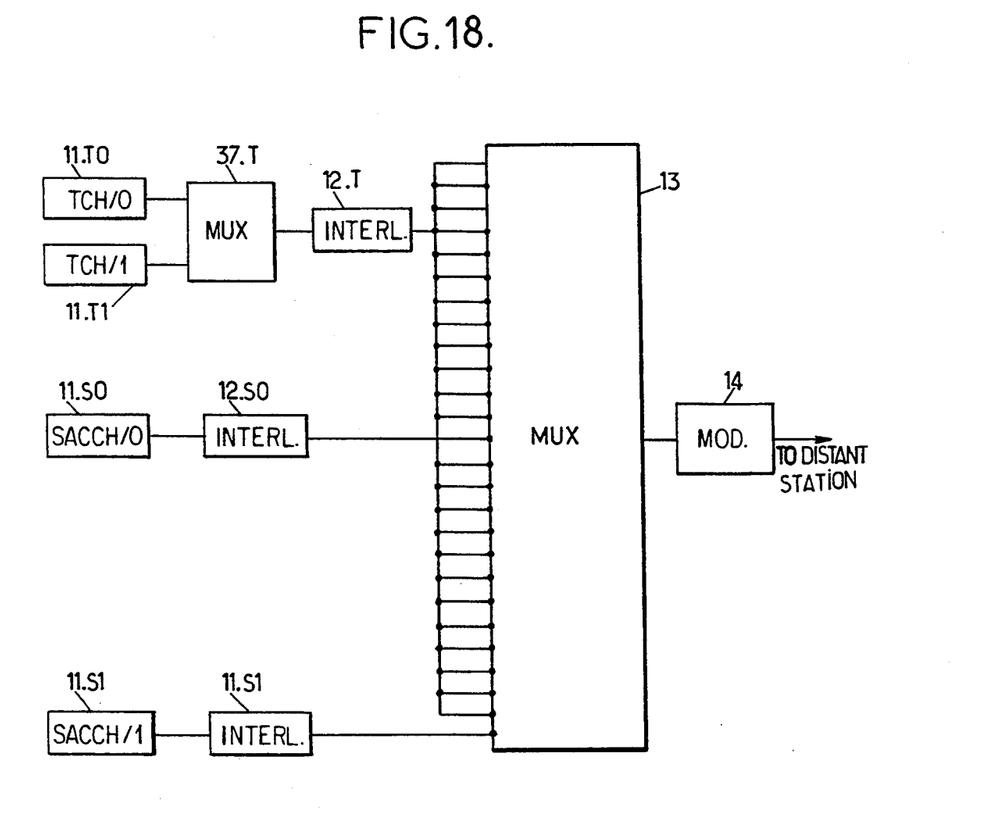

Last FIG. 18 gives an optimized implementation of a 26 superframe GSM structure according to the invention when the sub-channels of the same logical traffic channel can be interleaved. This solution omits the constraint on the VAD/DTX mode of the GSM.

We claim:

1. A time division multiple access (TDMA) digital radio communication method, said method comprising successively transmitting TDM frames of constant length, each comprising a succession of p time slots of constant duration, so as to distribute a physical transmission channel into p logic channels each comprising time slots having a same rank in said TDMA frames, dividing at least one of said logic channels into n sub-channels dedicated to different communications, by assigning respective groups of k consecutive time slots pertaining to said logic channel to a respective one of said n sub-channels, the groups of k consecutive time slots assigned to each of said n sub-channels being regularly time-distributed, formatting the information to be transmitted on a sub-channel as a sequence of information blocks each extending over N bursts, each burst corresponding to one time slot, and transmitting the N bursts of each of said information blocks in N successive time slots assigned to said sub-channel, each information block being completely transmitted after a delay $R_T = \{E((N-1)/k).k.n.p + MOD(N-1,k).p + 1\}.T_T$, where N, k, n and p are integers greater than 1 such that MOD $(N-1,k) \neq 0$, $E(X)$ designates the integer part of X, MOD(N−1,k) designates the residual part of (N−1)mod k, and $T_T$ designates the constant duration of a time slot.

2. A method according to claim 1, wherein k is equal to N/λ, where λ is an integer.

3. A time division multiple access (TDMA) digital radio communication method, said method comprising successively transmitting TDMA frames of constant length, each comprising a succession of p time slots of constant duration, so as to distribute a physical transmission channel into p traffic logic channels each comprising time slots having a same rank in said TDMA frames, and p control logic channels, each control logic channel being associated with a respective one of said p traffic logic channels and comprising regularly spaced time slots having the same rank as the time slots of the associated traffic logic channel in said TDMA frames, dividing at least one of said traffic logic channels into n sub-channels dedicated to different communications, by assigning respective groups of k consecutive time slots pertaining to said traffic logic channel to a respective one of said n sub-channels, the groups of k consecutive time slots assigned to each of said n sub-channels being regularly time-distributed, formatting the information to be transmitted on a sub-channel as a sequence of information blocks each extending over N bursts, each burst corresponding to one time slot, and transmitting the N bursts of each of said information blocks in N successive time slots assigned to said sub-channel, each information block being completely transmitted after a delay $R_T = \{E((N-1)/k).k.n.p + p + MOD(N-1,k).p + 1\}.T_T$, where N, k, n and p are integers greater than 1 such that MOD(N−1,k)$\neq$0, $E(X)$ designates the integer part of X, MOD(N−1,k) designates the residual part of (N−1)mod k, and $T_T$ designates the constant duration of a time slot.

4. A method according to claim 3, wherein k is equal to N/λ, where λ is an integer.

5. A time division multiple access (TDMA) digital radio-communication method, said method comprising time dividing a physical communication channel into a plurality of traffic logic channels assignable to different communications, successively transmitting TDMA frames of constant length, each comprising a plurality of time slots of constant duration, on said physical communication channel, each traffic logic channel comprising time slots having a same rank in successive TDMA frames, time dividing at least one of the traffic logic channels into a plurality of sub-channels carrying data originating from a same source capable of mutually synchronizing said data, processing the data carried by all sub-channels of a same traffic logic channel as a same information flow, corresponding to only one traffic logic channel, and carrying out data transmission on said traffic logic channel without dedicating the time slots to a specified sub-channel, each time slot carrying data regarding a plurality of sub-channels of the same logic channel.

6. A method according to claim 5, wherein each traffic logic channel has, associated therewith, a control logic channel comprising regularly spaced time slots having the same rank as the time slots of said traffic logic channel.

* * * * *